United States Patent
Zhao et al.

(10) Patent No.: US 11,086,916 B2
(45) Date of Patent: Aug. 10, 2021

(54) SYSTEM AND METHOD FOR ANALYZING AND VISUALIZING TEAM CONVERSATIONAL DATA

(71) Applicant: FUJIFILM Business Innovation Corp., Tokyo (JP)

(72) Inventors: Jian Zhao, Cupertino, CA (US); Siwei Fu, Davis, CA (US)

(73) Assignee: FUJIFILM BUSINESS INNOVATION CORP., Tokyo (JP)

( * ) Notice: Subject to any disclaimer, the term of this patent is extended or adjusted under 35 U.S.C. 154(b) by 241 days.

(21) Appl. No.: 15/857,901

(22) Filed: Dec. 29, 2017

(65) Prior Publication Data
US 2019/0205464 A1    Jul. 4, 2019

(51) Int. Cl.
| | |
|---|---|
| *G06F 16/338* | (2019.01) |
| *G06F 16/33* | (2019.01) |
| *G06F 16/34* | (2019.01) |
| *G06Q 10/10* | (2012.01) |

(52) U.S. Cl.
CPC ........ *G06F 16/338* (2019.01); *G06F 16/3334* (2019.01); *G06F 16/34* (2019.01); *G06Q 10/10* (2013.01)

(58) Field of Classification Search
CPC .... G06F 16/338; G06F 16/34; G06F 16/3334; G06Q 10/10; G06Q 10/107; G06Q 50/01
See application file for complete search history.

(56) References Cited

U.S. PATENT DOCUMENTS

| | | | | |
|---|---|---|---|---|
| 7,924,283 | B1* | 4/2011 | Hao | G06T 11/206 345/440 |
| 7,966,322 | B2 | 6/2011 | Clover | |
| 8,924,843 | B1* | 12/2014 | Hao | G06T 11/206 715/220 |
| 2012/0124147 | A1* | 5/2012 | Hamlin | G06N 5/025 709/206 |
| 2018/0075005 | A1* | 3/2018 | Marks | G06F 17/2229 |

OTHER PUBLICATIONS

Marcus, et al. TwitInfo: Aggregating and Visualizing Microblogs for Event Exploration. CHI 2011, pp. 227-236. (Year: 2011).*
Box and Whisker Plot. https://datavizcatalogue.com/methods/box_plot.html, 2016, pp. 1-3. (Year: 2016).*
(Continued)

*Primary Examiner* — Alex Gofman
*Assistant Examiner* — Shelly X Qian
(74) *Attorney, Agent, or Firm* — Procopio, Cory, Hargreaves & Savitch LLP

(57) ABSTRACT

A method of analyzing conversational messages may be provided. The method including receiving a query defining a timespan of messages, retrieving at least two conversational messages associated with the defined timespan from a plurality of interleaved messages, de-threading the at least two conversational messages to identify at least one conversational thread, and generating a visualization of conversational threads based on the defined timespan, the at least one conversational thread, the visualization organized into time intervals based on the defined timespan.

20 Claims, 14 Drawing Sheets
(11 of 14 Drawing Sheet(s) Filed in Color)

(56) References Cited

OTHER PUBLICATIONS

Enamul Hoque et al., "MultiConVis: A Text Analytics System for Exploring a Collection of Online Conversation". IUI 2016, Mar. 7-10, 2016, Sonoma, CA, USA, pp. 96-107, (12 pages).

Bernard Kerr., 2003. Thread Arcs: an email thread visualization. In Information Visualization, 2003. INFOVIS 2003. IEEE Symposium on, (8 pages).

Bum Chul Kwon et al., "VisOHC: Designing Visual Analytics for Online Health Communities", IEEE Transactions on Visualization and Computer Graphics, vol. 22, No. 1, (Jan. 2016), pp. 71-80. (10 pages).

Judith Donath and Fernanda B. Viégas. 2002. The chat circles series: explorations in designing abstract graphical communication interfaces. In Proceedings of the 4th conference on Designing interactive systems: processes, practices, methods, and techniques (DIS '02). ACM, New York, NY, USA, (10 pages).

Mennatallah El-Assady et al, "ConToVi: Multi-Party Conversation Exploration using Topic-Space Views", Erschienen in: Computer Forum; 35 (2016), 3-S., pp. 431-440. (10 pages).

Micha Elsner and Eugene Charniak. 2010. Disentangling chat. Comput. Linguist. 36, 3 (Sep. 2010), 389-409, (21 pages).

Gilly Leshed et al., "Visualizing Real-Time Language-Based Feedback on Teamwork Behavior in Computer-Mediated Groups", CHI 2009, Apr. 4-9, 2009,(10 pages).

Stuart Rose et al., Automatic Keyword Extraction from Individual Documents. In M. W. Berry & J. Kogan (Eds.), Text Mining: Applications and Theory (2010) (18 pages).

Jarke J. van Wijk et al., "Cluster and Calendar based Visualization of Time Series Data", IEEE Symposium on Information Visualization, Oct. 25-26, 1999, (6 pages).

Jian Zhao et al., "#FluxFlow: Visual Analysis of Anomalous Information Spreading on Social Media", IEEE Transactions on Visualization and Computer Graphics, 20(12), pp. 1773-1782, (Dec. 2014).

\* cited by examiner

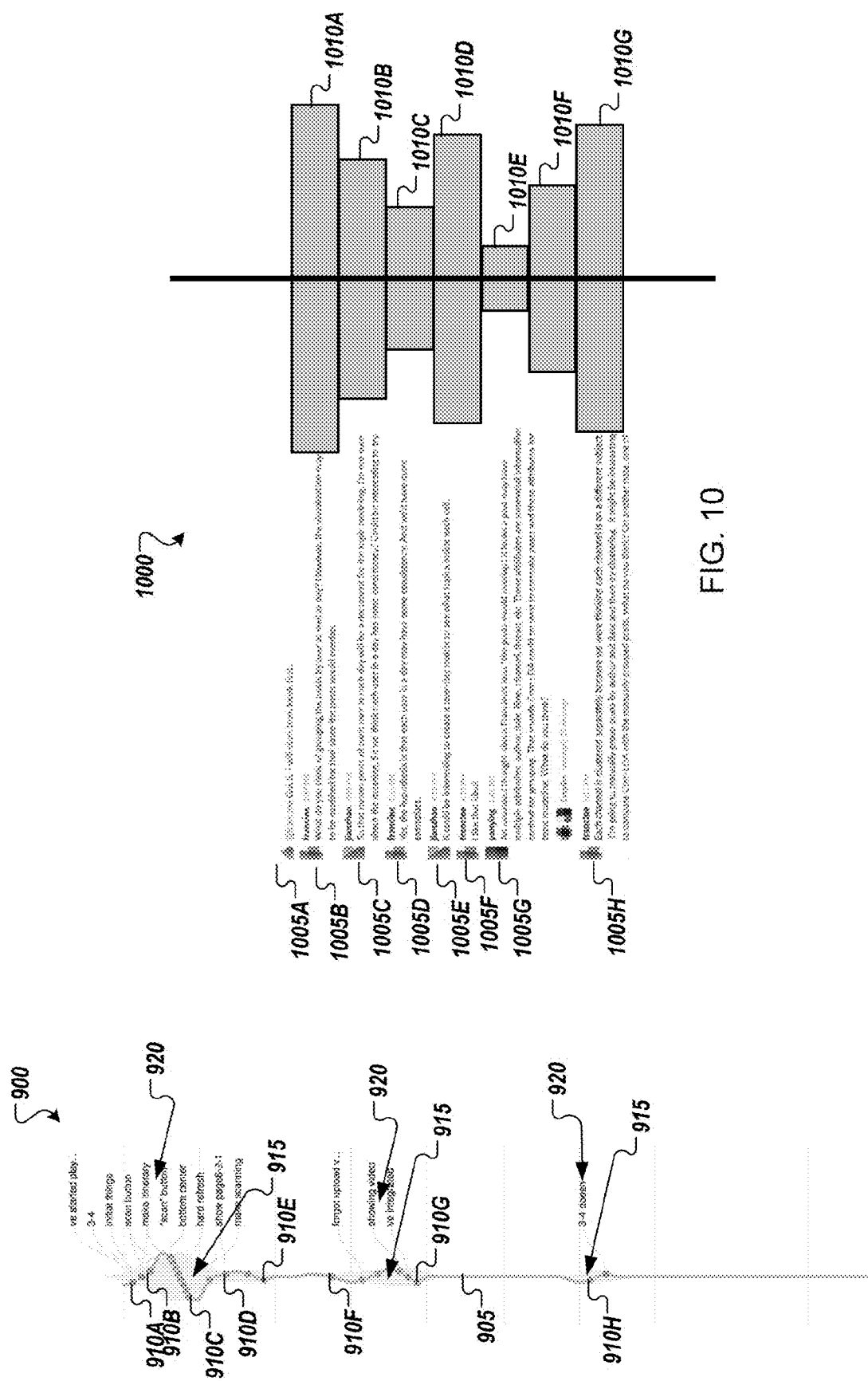

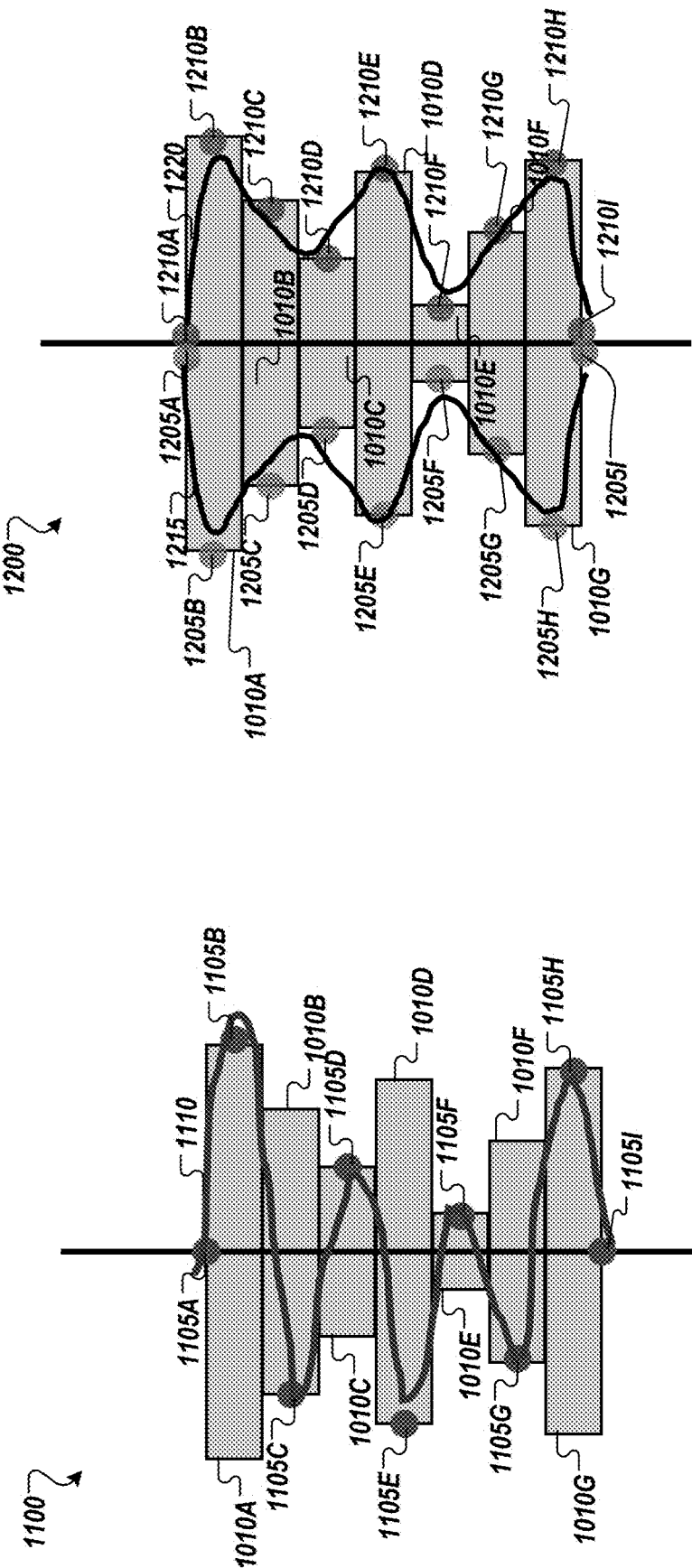

US 11,086,916 B2

SYSTEM AND METHOD FOR ANALYZING AND VISUALIZING TEAM CONVERSATIONAL DATA

BACKGROUND

Field

The present disclosure relates to electronic communication systems, and more specifically, to systems and methods of analyzing and visualizing team conversational data in electronic communication systems.

Related Art

Messaging platforms that allow instantaneous communication between collaborating team members (e.g., MICROSOFT TEAM) are becoming increasingly popular in organizations as means of team communication. In these related art platforms, data may be generated (e.g., conversation logs) that may be important to understanding how team members work together. This data may provide insights for improving the efficiency of team collaboration. For example, a team manager might use such information to understand the health of team and report team activities to higher management. Additionally, a new employee or existing employee returning from an extended leave may examine the data to learn key aspects of past projects and get on board more quickly.

However, the analysis of team conversational data may be non-trivial and problematic for related art systems for at least two main reasons. First, the growing volume data produced by related art systems and the heterogeneous nature of the data (e.g., containing textual, temporal, and team member information) may hinder users from easily grasping meaningful and critical patterns. Second, multiple topics may be discussed simultaneously during team communication on these platforms, and individual conversational threads may often be interleaved, posing challenges for users to digest and understand.

In some related art systems, visualization may assist in exploring conversational data in an intuitive and interactive way. For example, some related art may attempt to help users understand structural and temporal patterns of conversational threads. Other related art may employ analytical techniques to facilitate the investigation of topics and sentiment of conversations in the data. However, these related art techniques may be limited to explicitly threaded conversational data (e.g., data inherently having a pre-existing threaded component such as emails and forum replies). In the related art, little attention has been done that may the challenges in understanding team collaboration and communication with messaging platforms that generate interleaving conversational data (such as instant message or chat platform data).

SUMMARY OF THE DISCLOSURE

Aspects of the present application may relate to a method of analyzing conversational messages. The method may include receiving a query defining a timespan of messages, retrieving at least two conversational messages associated with the defined timespan from a plurality of interleaved messages, de-threading the at least two conversational messages to identify at least one conversational thread, and generating a visualization of conversational threads based on the defined timespan, the at least one conversational thread, the visualization organized into time intervals based on the defined timespan.

Additional aspects of the present application may relate to a non-transitory computer readable medium having stored therein a program for making a computer execute a method of analyzing conversational messages. The method may include receiving a query defining a timespan of messages, retrieving at least two conversational messages associated with the defined timespan from a plurality of interleaved messages, de-threading the at least two conversational messages to identify at least one conversational thread, and generating a visualization of conversational threads based on the defined timespan, the at least one conversational thread, the visualization organized into time intervals based on the defined timespan.

Further aspects of the present application relate to a computer apparatus configured to analyze a corpus comprising a plurality of unstructured messages. The computer apparatus may include a memory storing the plurality of interleaved messages, and a processor executing a process. The process may include receiving a query defining a timespan of messages, retrieving at least two conversational messages associated with the defined timespan from a plurality of interleaved messages, de-threading the at least two conversational messages to identify at least one conversational thread, and generating a visualization of conversational threads based on the defined timespan, the at least one conversational thread, the visualization organized into time intervals based on the defined timespan.

Still further aspects of the present application relate to a computer apparatus configured to analyze a corpus comprising a plurality of unstructured messages. The computer apparatus may include a memory storing the plurality of interleaved messages, receiving means for receiving a query defining a timespan of messages, retrieving means for retrieving at least two conversational messages associated with the defined timespan from a plurality of interleaved messages, de-threading means for de-threading the at least two conversational messages to identify at least one conversational thread, and generating means for generating a visualization of conversational threads based on the defined timespan, the at least one conversational thread, the visualization organized into time intervals based on the defined timespan.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 9 illustrates a UI with a generalized curve showing a plurality of posts or messages distributed over a temporal range in accordance with an example implementation of the present application.

FIG. 10 illustrates a graphical representation of a binning process in accordance with an example implementation of the present application.

FIG. 11 illustrates a graphical representation of the curve generating process in accordance with an example implementation of the present application.

FIG. 12 illustrates a graphical representation of the curve volume generating process in accordance with an example implementation of the present application.

DETAILED DESCRIPTION

Figure 1A:
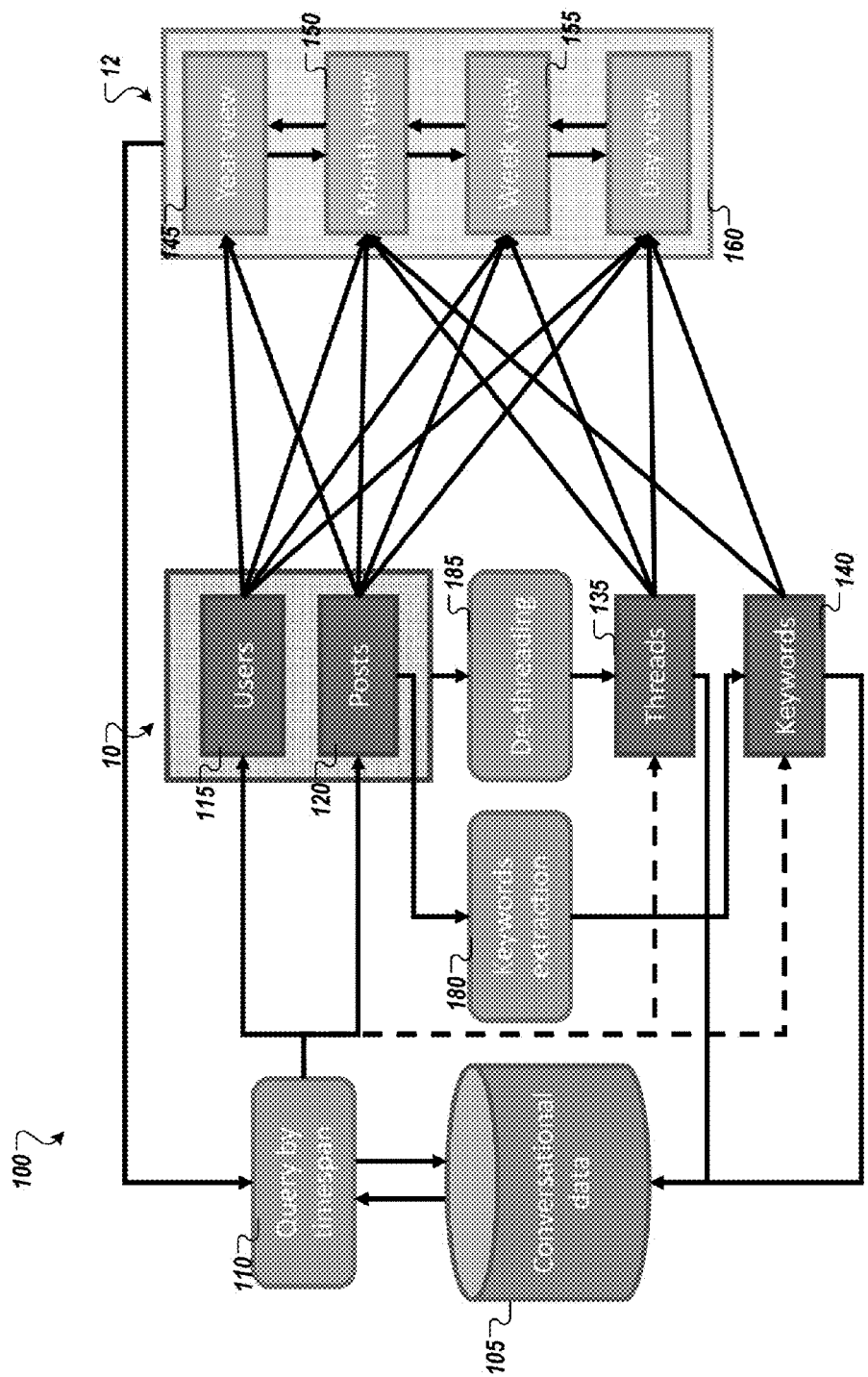
FIG. 1A illustrates a schematic diagram of an overall architecture of a messaging visualization system in accordance with an example implementation of the present application.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or operator control over certain aspects of the implementation, depending on the desired implementation of one of ordinary skill in the art practicing implementations of the present application.

As mentioned above, messaging platforms for instantaneous messaging among collaborating team members (e.g., Microsoft Team) are gaining popularity in organizations. As these systems become more popular, volumes of conversational data are generated daily as part of team communication activities. This data can provide valuable information in understanding team collaboration, thus further increasing efficiency. However, the data volume may be huge, and the conversations often intertwine with each other. To address these problems, example implementations of the present application may provide a visualization system for analyzing team conversational data. In some example implementations, such a system may use calendar based interface that may allow users to explore massive message logs at variable time scales (such as year, month, week, and day). In some example implementations, the system may also integrate analytical methods into a pipeline that disentangles interleaving conversational threads, and summarizes their content from different aspects with a novel visual representation. Example implementations may also provide a novel visual representation of conversational threads, which can illustrate both overall activity trends of threads and detailed information (e.g., keywords and owners of individual posts).

Figure 1B:
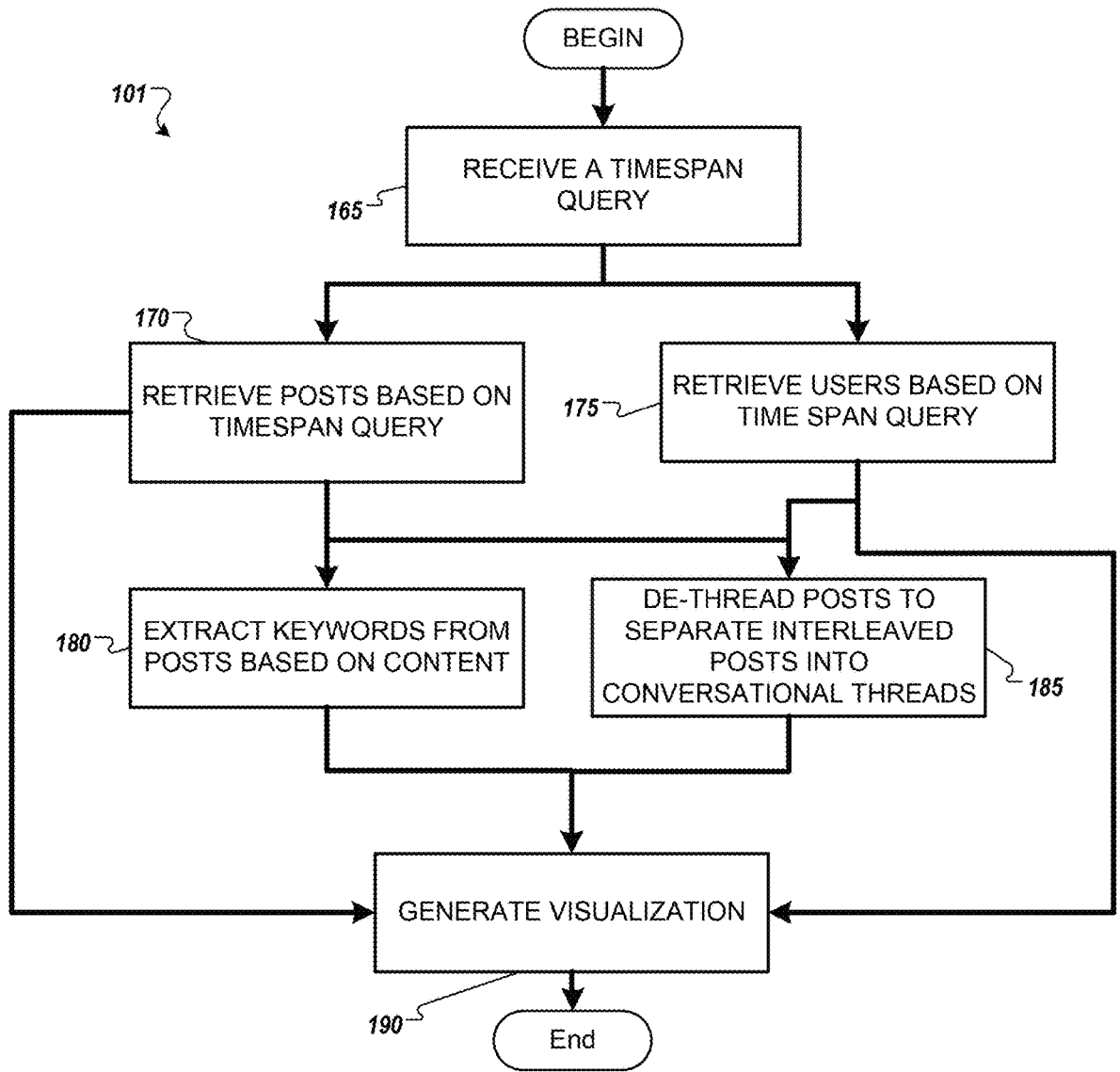
FIG. 1B illustrates a flow chart of a process for visualizing message or post data in accordance with an example implementation of the present application.

FIG. 1A illustrates a schematic diagram of an overall architecture of the messaging visualization system 100 in accordance with an example implementation of the present application. Further, FIG. 1B illustrates a flow chart of a process 101 for visualizing message or post data in accordance with an example implementation of the present application. As illustrated, the system 100 includes a database 105 storing the conversation data and conversational logs. At 165 of the process 101, a timespan query 110 is received or executed and query results 10 are retrieved that may include user information 115 (at 175 of process 101) and post information 120 (at 170 of process 101) within the queried timespan from the database 105. The timespan query may be specified by a frontend visualization 12 (e.g., a user interface or UI) provided to a user performing analysis or data review. FIGS. 2-8 discussed below all illustrate example implementations of a UI that may be used to specify the time frame for the query.

Based on the retrieved query results (e.g., the retrieved users and retrieved posts), a de-threading operation may be performed at 185 to separate the interleaving conversations into single conversational threads. The de-threading operation at 185 is not particularly limited and may include using one or more neural networks to calculate similarities between pairs of posts or messages in the conversation data based on detected content features in the posts or messages. Based on the calculated similarities, pairs of posts may be linked together to form threads. Other de-treading operations may be apparent to a person of ordinary skill in the art. The de-threading operation at 185 may produce a set of conversational threads 135 as illustrated.

Prior to, subsequent to, or in parallel with 185, keywords may be extracted from each post using a keyword extraction method at 180. For example, natural language analysis may be used to detect the content of textual messages and extract keywords. Similarly, object recognition, facial recognition, or any other visual recognition techniques that might be apparent to a person of ordinary skill in the art may be used to summarize visual data associated with posts or messages and extract keywords from the summarized visual data. Further, voice recognition, audio identification, or any other audio recognition techniques that might be apparent to a person of ordinary skill in the art may be used to summarize audio data and extract keywords from the summarized audio data. The keyword extraction operation at 180 may produce a set of keywords 140 associated with each of the posts 120.

All the original and derived information, including users 115, posts 120, threads 135, and keywords 140 may be provided to the frontend visualization 12 as needed to produce one of a series of views 145-160 at 190 of process 101. For example, the available views may vary depending on a specified time scale (such as a year view 145, a month view 150, a week view 155, and a day view 160). Further, the type of data requested by and provided to the front visualization may vary depending on the view (145-160). For example, the year view 145 may only request and receive user data 115 and post data 120. Similarly, the month view 150, week view 155, and day view 160 may each request and receive user data 115, post data 120, thread data 135 and keyword data 140. In some example implementations, the threads 135 and keywords 140 may be pre-computed and stored in the database to increase the performance initially, or, when requested, computed and stored back to the database to increase performance for future queries.

FIGS. 2-8 illustrate several User Interfaces (UIs) that may be used as front end visualizations in accordance with example implementations of the present application. The analysis of team communication activities provided by example implementations may range from different lengths of time periods due to different user needs. For example, a manager who wants to get an overview may only need to look at monthly (FIG. 3) or yearly data (FIG. 2) at a higher-level to get reflections of how projects have advanced and how team members have interacted with each other. Conversely, a team member may want to examine conversations in the past week (FIGS. 4-8) at a relatively lower-level to summarize activities they have involved. Moreover, the intensity of team activities may often varies a lot across time, which may cause difficulty in identifying critical information from conversational data. Example implementations of the present application may provide a multi-scale method that presents the data in different time scales including yearly (FIG. 2), monthly (FIG. 3), weekly (FIG. 4-8), and daily views (illustrated in FIG. 5 embedded as part of the weekly view), based on a calendar scalable UI.

Figure 2:
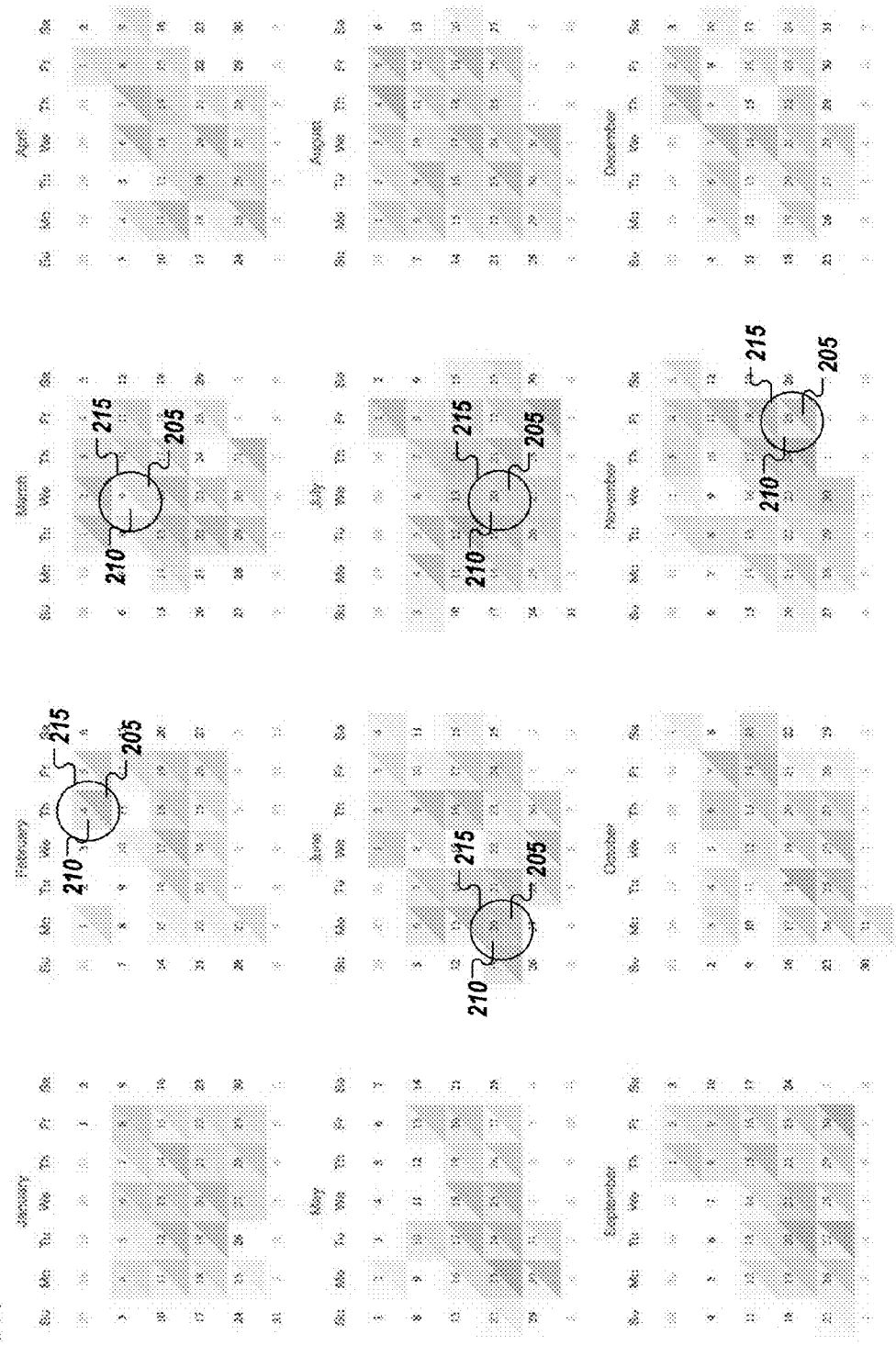
FIG. 2 illustrates a UI illustrating a yearly view of the front end visualization of an example implementation of the present application.

FIG. 2 illustrates a UI 200 illustrating a yearly view of the front end visualization 12 of an example implementation of the present application. The UI 200 may be displayed on a display device (e.g., a cathode ray display, an LCD display, an LED display, an OLED display, a touch screen display, or any display that might be apparent to a person of ordinary skill in the art) associated with a computing device such as the computing device 1605 illustrated in the computing environment 1600 of FIG. 16. As discussed above, the yearly view UI 200 only requests and received the user data 115 and the post data 120 only and does not request thread data 135 or keyword data 140.

As illustrated, the year view UI 200 may provide an overview (represented by the area within each of the exemplar circles 215 provided) of team conversational activities for each day during the year. In some example implementations, the overview 215 provided includes a pair of triangles 205, 210 representing the number of users posting (triangle 205) and the number of posts (triangle 210) each day. The color hues of triangles 205, 210 for each day may correspond to the numbers of users posting and posts being posted, with darker hues corresponding to larger numbers. In other example implementations, the two triangles may encode for other attributes of the data other than just the numbers of users and posts. For example in some implementations the triangles may encode for message sentiment, and/or numbers of topics. Further, in some example implementations, the user may have an option to choose which attributes they want to see on the calendar.

As may be apparent the yearly view UI 200 may provide a user with an over view of which parts of the year have the largest number of posts (darkest days) and which parts of the year have the lowest number of posts (lightest days). For example, the middle of July shows a lot of active both in terms of users posting (dark orange) and posts being posted (dark purple). Conversely, the last two weeks of December show very low levels of activity both in terms of users posting (light orange/almost white) and posts being posted (light purple/almost white).

Figure 3:
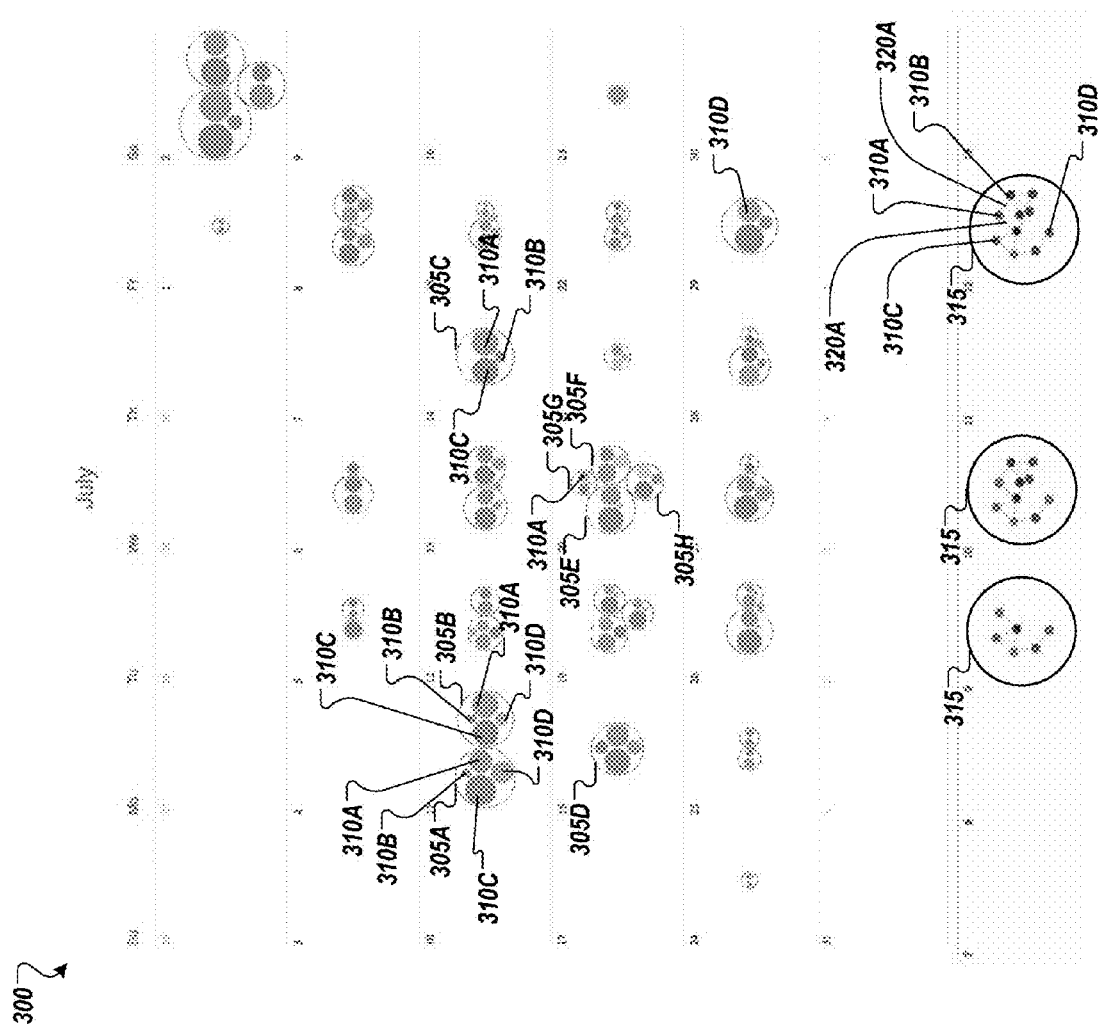
FIG. 3 illustrates a UI illustrating a monthly view of the front end visualization of an example implementation of the present application.

FIG. 3 illustrates a UI 300 illustrating a monthly view of the front end visualization 12 of an example implementation of the present application. The UI 300 may be displayed on a display device (e.g., a cathode ray display, an LCD display, an LED display, an OLED display, a touch screen display, or any display that might be apparent to a person of ordinary skill in the art) associated with a computing device such as the computing device 1605 illustrated in the computing environment 1600 of FIG. 16. As discussed above, the monthly view UI 300 requests and receives the user data 115, the post data 120, the thread data 135, and the keyword data 140. The monthly view UI 300 may be navigated to from the yearly view UI 200 of FIG. 2 by clinking or selecting one of the displayed months.

As illustrated, the month view UI 300 may illustrate each separate conversational thread discussed daily as hollow black-line circles 305. For example, the UI 300 of FIG. 3 illustrates that two separate conversational threads (305A, 305B) occurred on July 11, and four separate threads (305E, 305F, 305G, 305H) occurred on July 20. Conversely, only one conversational thread 305C occurred on July14 and one conversational thread 305D occurred on July 18. This may allow visualization of what projects team members were working on and talking about for a given week.

Within each thread (305A-305H), participating team members may be represented by individual solid circles (310A-310D), where the color indicates person identity and the size indicates their posting activity level in that particular thread. For example, orange circle 310A may correspond to user "Jon Jones" who was a large contributor to thread 305A and thread 305B on July 11, but a smaller contributor to thread 305G on July 20. The UI 300 may also allow visualization of which users contribute to multiple threads (e.g., user Jon Jones 310A, who contributes to many different threads (e.g., all four threads 305E-305H on July 20). Individuals identified as large contributors to individual threads (e.g., many posts to a single thread) might be considered critical team members. Further, regular (e.g., frequent) contributors to multiple threads might be considered "thought leaders" within the organization. The UI 300 may allow critical team members or thought leaders to be identified.

In other example implementations, the color of the solid circles may encode for other attributes of the data other than just the user or author information. For example in some implementations the circles may encode for message sentiment, and/or detected user emotion. Further, in some example implementations, the user may have an option to choose which attributes they want to see on the visualization.

Additionally, in some example implementations, the UI 300 may also provide a social graph visualization (indicated by the area within the circles 315) each day in this month. This social graph visualization 315 may illustrate the social network of team members (310A-310D) based on the threads they are involved. In this social graph visualization, a node represents a team member (310A-310D), and a link 315A, 315B represents that they talk to each other in one thread. This may allow visualization of the team dynamics based on the chat or message posts.

Figure 4:
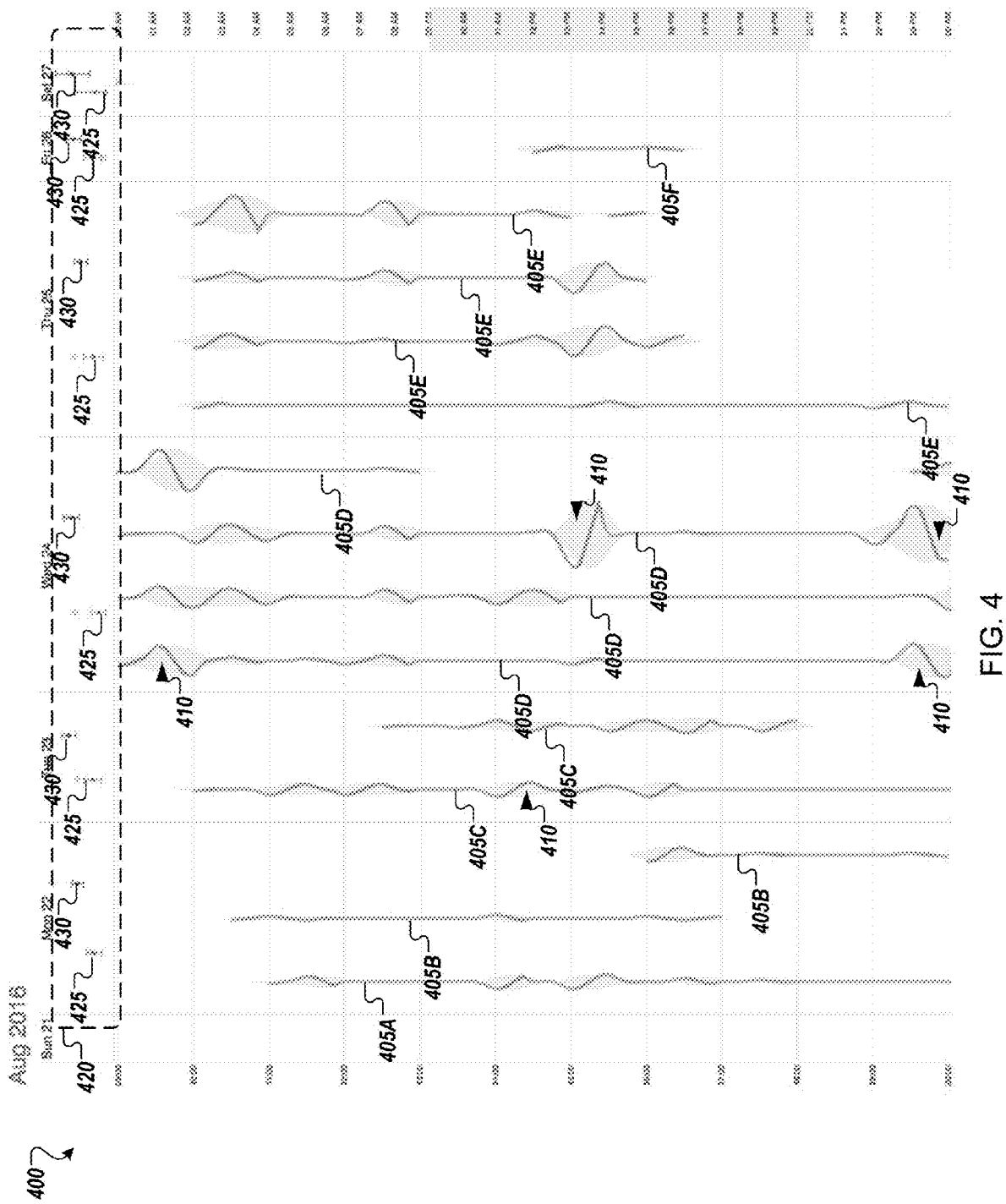
FIG. 4 illustrates a UI illustrating a weekly view of the front end visualization of an example implementation of the present application.

FIG. 4 illustrates a UI 400 illustrating a weekly view of the front end visualization 12 of an example implementation of the present application. The UI 400 may be displayed on a display device (e.g., a cathode ray display, an LCD display, an LED display, an OLED display, a touch screen display, or any display that might be apparent to a person of ordinary skill in the art) associated with a computing device such as the computing device 1605 illustrated in the computing environment 1600 of FIG. 16. As discussed above, the weekly view UI 400 requests and receives the user data 115, the post data 120, the thread data 135, and the keyword data 140. The weekly view UI 400 may be navigated to from the monthly view UI 300 of FIG. 3 by clinking or selecting one of the displayed weeks.

The week view UI 400 illustrates temporal activities of conversational threads within a week using curves 405A-405F. In each curve, 405A-405F, the vertical axis may represent time of each day. As discussed in greater detail below, the lateral movement of each curve along the Y-axis of each curve represents number and sequence of posts occurring throughout the day (e.g., the greater the number of posts the more lateral movement along the Y-axis). The number of posts occurring may correspond to the absolute value of along the Y-axis. For each curve, participating users (e.g., team members) may be are color-coded similar to the color coding associated with the monthly UI 300 discussed above. For each curve 405A-405F, a gray background 410 may be provided at areas of posting to illustrate the volume of posts across time.

In other example implementations, the color coding may encode for other attributes of the data other than just the user or author information. For example in some implementations the color-coding may encode for message sentiment, and/or detected user emotion. Further, in some example implementations, the user may have an option to choose which attributes they want to see on the visualization.

Additionally, in some example implementations, the UI 400 may also include a box plot region 420 illustrating a comparison for each displayed day to daily averages of days within the remainder of the year. For each day, a box plot 425 may be provided illustrating comparisons between users posting per day and the daily averages of days within the remainder of the year. Additionally, for each day, a box plot 430 may also be provided illustrating comparisons between total posts per day and the daily averages of days within the remainder of the year.

Figure 5:
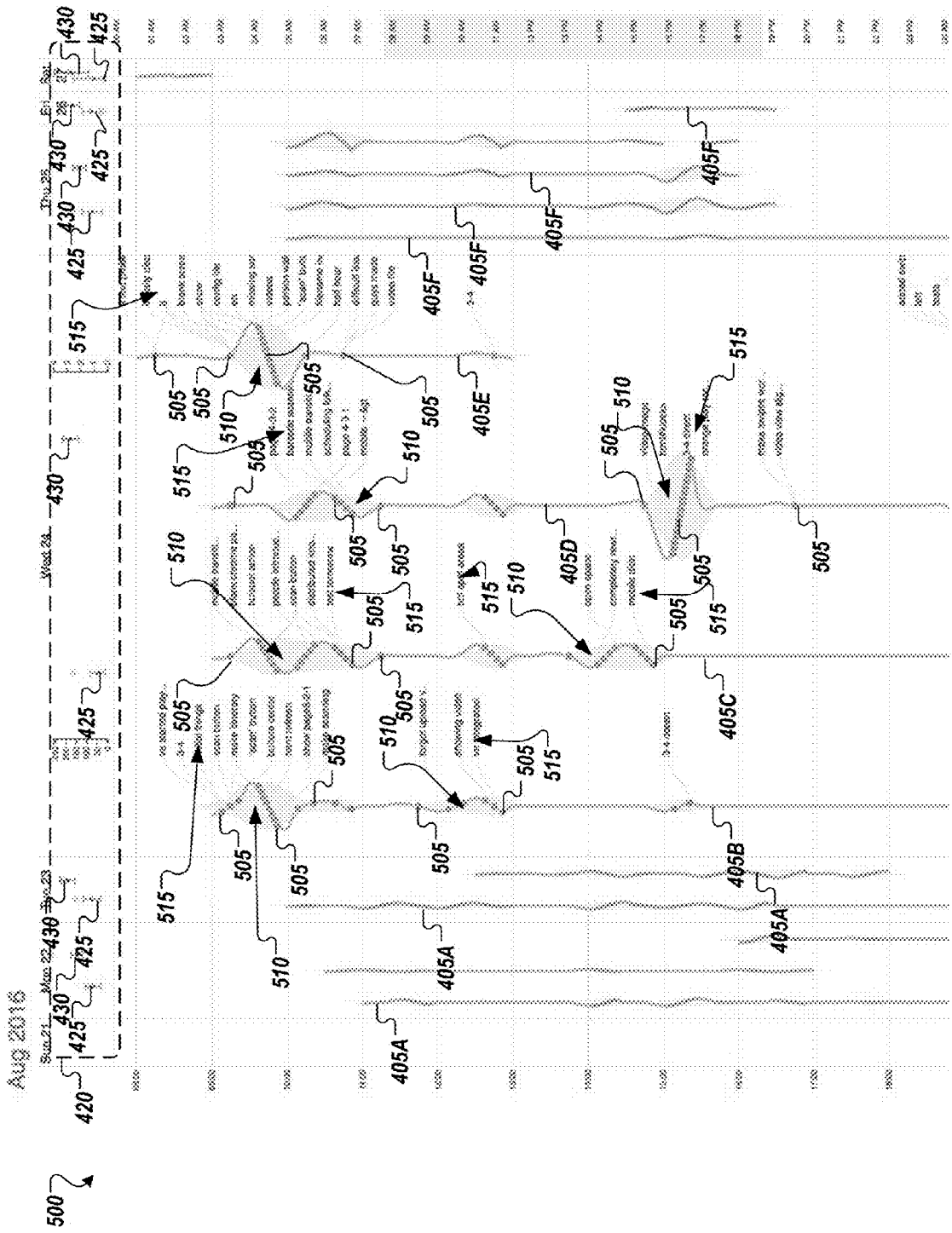
FIG. 5 illustrates a UI illustrating a daily view embedded in a weekly view of the front end visualization of an example implementation of the present application.

FIG. 5 illustrates a UI 500 illustrating a daily view embedded in a weekly view of the front end visualization 12 of an example implementation of the present application. The UI 500 may be displayed on a display device (e.g., a cathode ray display, an LCD display, an LED display, an OLED display, a touch screen display, or any display that might be apparent to a person of ordinary skill in the art) associated with a computing device such as the computing device 1605 illustrated in the computing environment 1600 of FIG. 16. As discussed above, the daily view UI 500 requests and receives the user data 115, the post data 120, the thread data 135, and the keyword data 140. The daily view UI 500 may be initiated from the weekly view UI 400 of FIG. 4 by clicking or selecting one of the displayed days.

Similarly to FIG. 4 discussed above, the UI 500 illustrates temporal activities of conversational threads within a week using curves 405A-405F. However, the day view UI 500, which is embedded within the week view UI 400, shows more details of the conversational threads represented by the curves 405A-405F within a day. For example curve 405B illustrates a plurality of posts, each post encoded as a small circle 505 color-coded with team members, and the gray background areas 510 also shows temporal post volumes. In addition, key phrases are extracted and shown in regions 515 along the side of the curves 405B-405E. Detailed information of generating this visual representation is discussed in greater detail below.

In other example implementations, the color coding may encode for other attributes of the data other than just the user or author information. For example in some implementations the color-coding may encode for message sentiment, and/or detected user emotion. Further, in some example implementations, the user may have an option to choose which attributes they want to see on the visualization.

Additionally, in some example implementations, the UI 500 may also include a box plot region 420 illustrating a comparison for each displayed day to daily averages of days within the remainder of the year. For each day, a box plot 425 may be provided illustrating comparisons between users posting per day and the daily averages of days within the remainder of the year. Additionally, for each day, a box plot 430 may also be provided illustrating comparisons between total posts per day and the daily averages of days within the remainder of the year.

Figure 6:
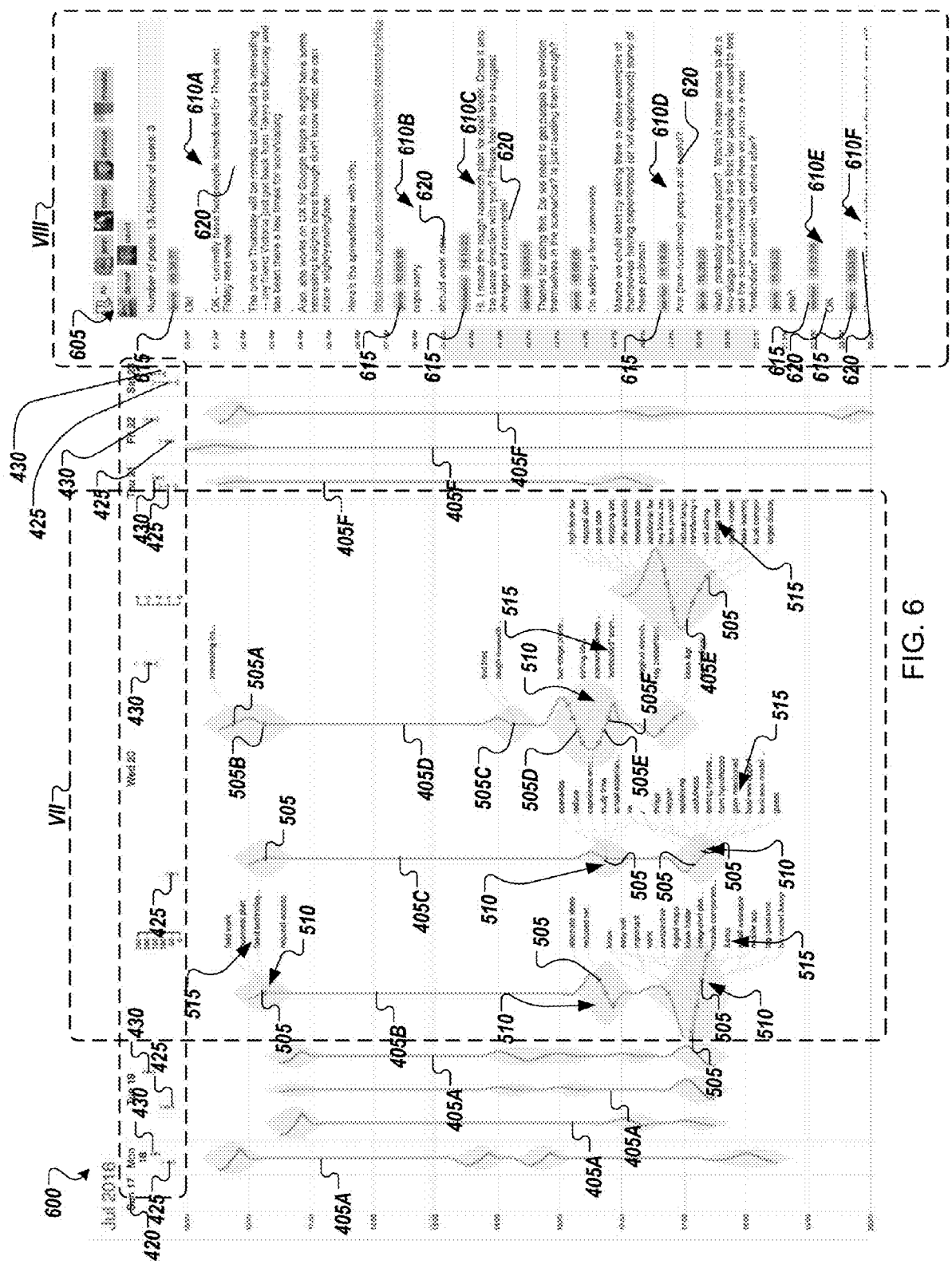
FIG. 6 illustrates another UI illustrating a daily view embedded in a weekly view of the front end visualization of an example implementation of the present application.
Figure 7:
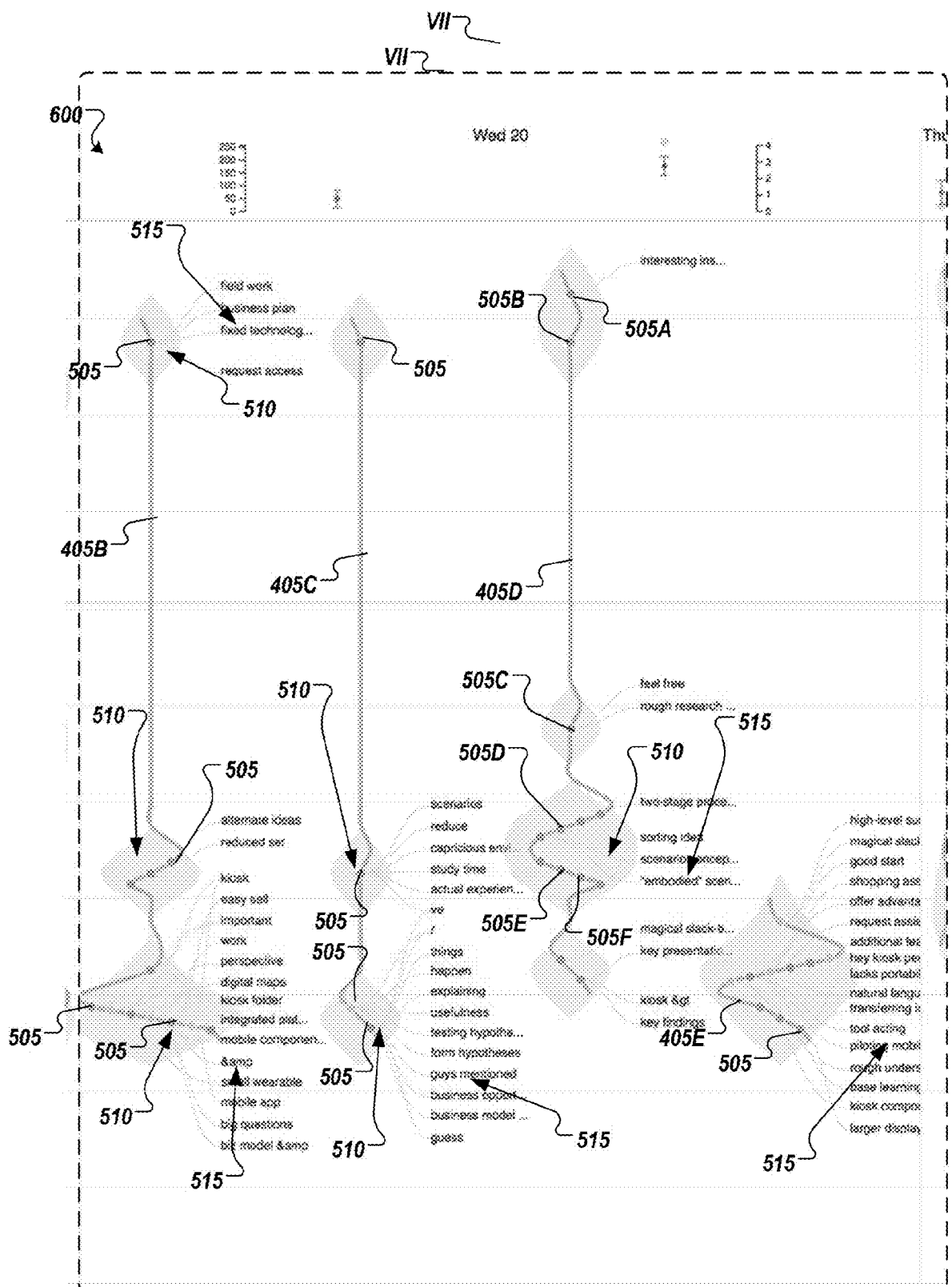
FIG. 7 illustrates an enlargement of the daily view region of the UI illustrated by the broken box VII of FIG. 6.
Figure 8:
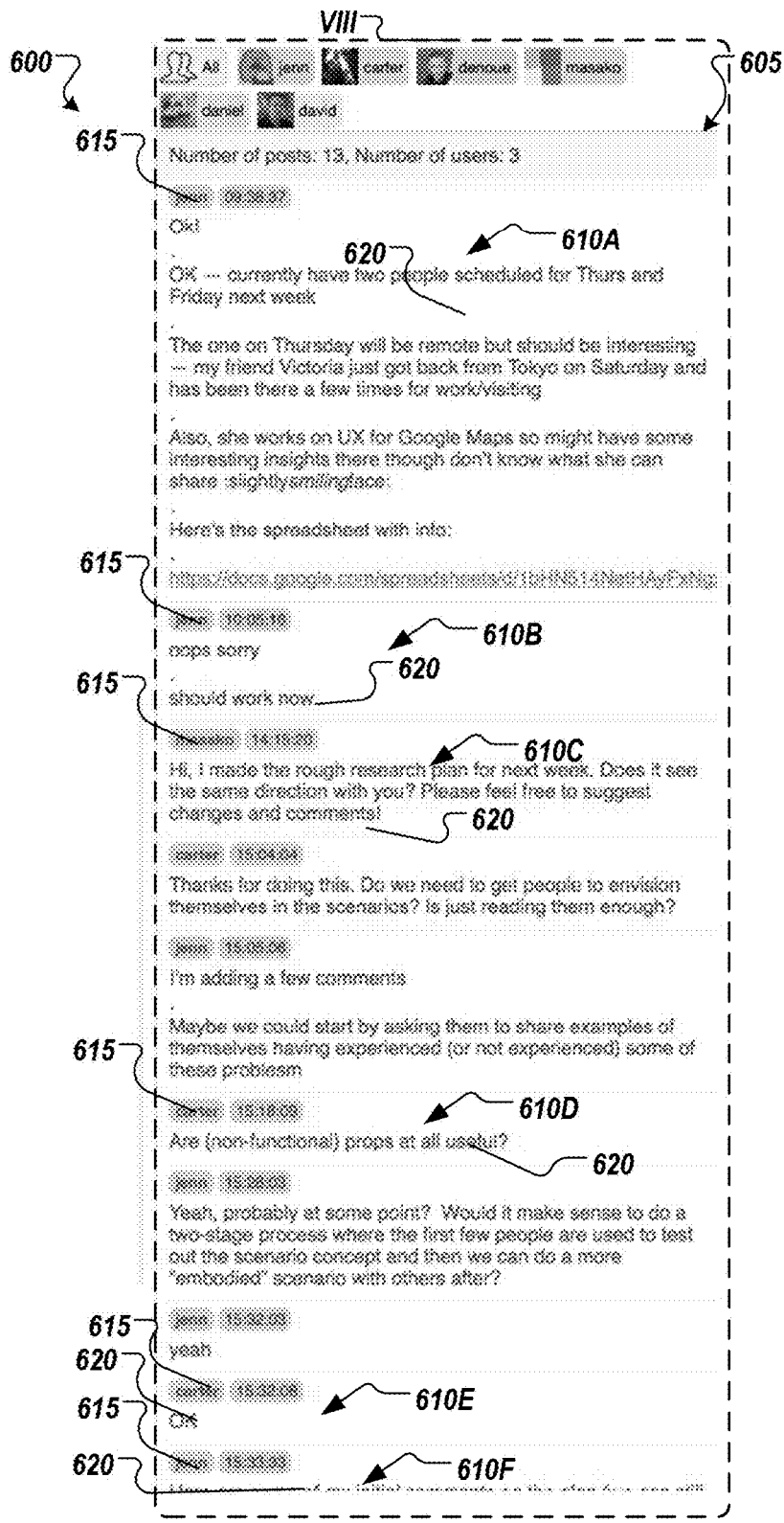
FIG. 8 illustrates an enlargement of another region of the UI 600 illustrated by the broken box VIII of FIG. 6.

FIG. 6 illustrates another UI 600 illustrating a daily view embedded in a weekly view of the front end visualization 12 of an example implementation of the present application. FIG. 7 illustrates an enlargement of the daily view region of the UI 600 illustrated by the broken box VII of FIG. 6. FIG. 8 illustrates an enlargement of another region of the UI 600 illustrated by the broken box VIII of FIG. 6. As the UI 600 includes features similar to the UI 500 illustrated in FIG. 5, similar reference numerals may be used in reference to similar aspects.

Figure 16:
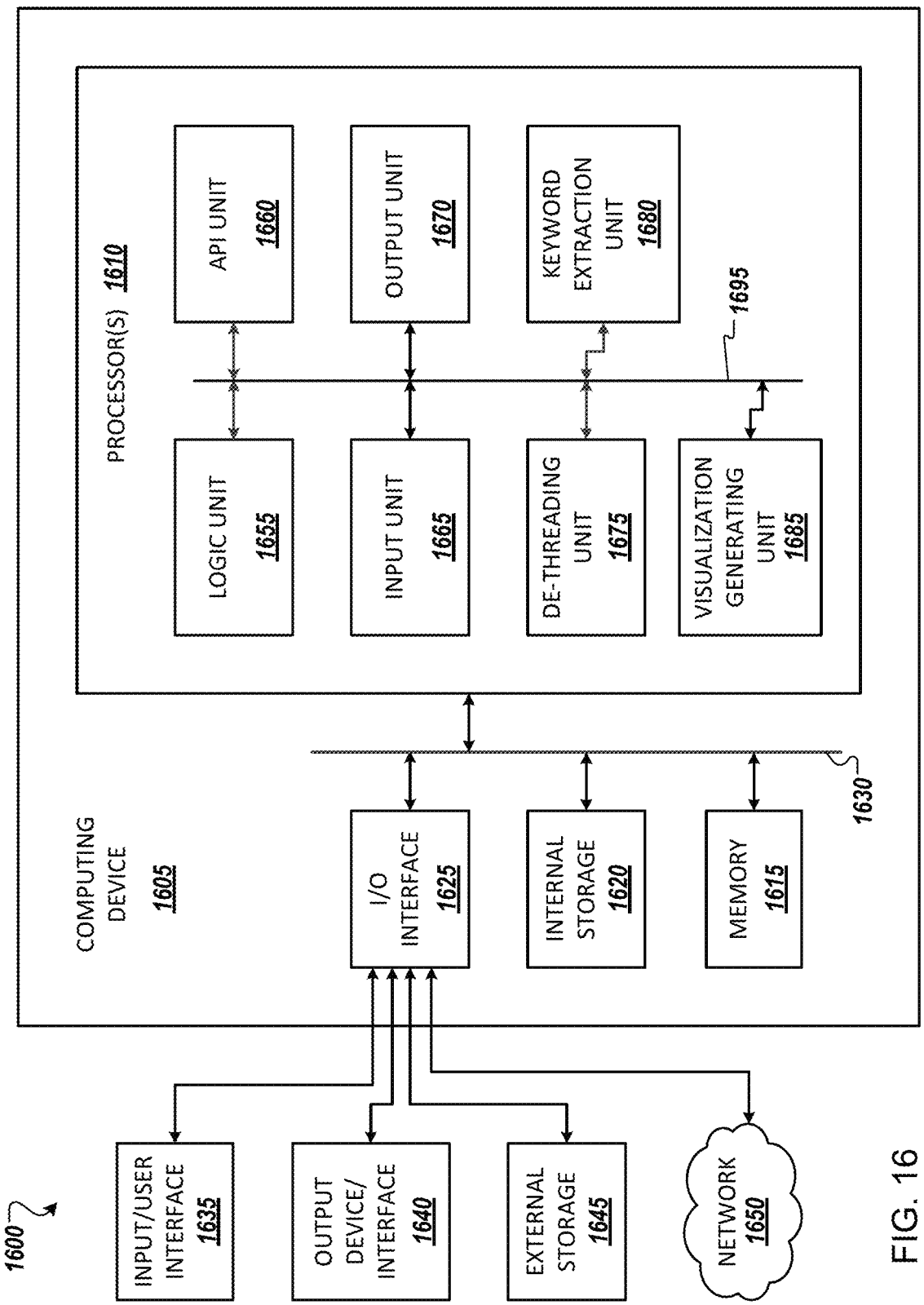
FIG. 16 illustrates an example computing environment with an example computer device suitable for use in some example implementations of the present application.

The UI 600 may be displayed on a display device (e.g., a cathode ray display, an LCD display, an LED display, an OLED display, a touch screen display, or any display that might be apparent to a person of ordinary skill in the art) associated with a computing device such as the computing device 1605 illustrated in the computing environment 1600 of FIG. 16. As discussed above, the daily view UI 600 requests and receives the user data 115, the post data 120, the thread data 135, and the keyword data 140. The daily view UI 600 may be initiated from a weekly view UI similar to the UI 400 of FIG. 4 by clicking or selecting one of the displayed days.

Again, the UI 600 illustrates temporal activities of conversational threads within a week using curves 405A-405F. However, the day view UI 600, which is embedded within a week view UI similar to the UI 400 of FIG. 4, shows details of the conversational threads represented by the curves 405A-405F within a day. Again, curve 405B illustrates a plurality of posts, each post encoded as a small circle 505 (505A-505F illustrate specific circles associated with messages or posts 610A-610F displayed in the pop-up window 605 discussed below) color-coded with team members, and the gray background areas 510 also shows temporal post volumes. In addition, key phrases are extracted and shown in regions 515 along the side of the curves 405B-405E.

In other example implementations, the color coding may encode for other attributes of the data other than just the user or author information. For example in some implementations the color-coding may encode for message sentiment, and/or detected user emotion. Further, in some example implementations, the user may have an option to choose which attributes they want to see on the visualization.

Additionally, in some example implementations, the UI 600 may also include a box plot region 420 illustrating a comparison for each displayed day to daily averages of days within the remainder of the year. For each day, a box plot 425 may be provided illustrating comparisons between users posting per day and the daily averages of days within the remainder of the year. Additionally, for each day, a box plot 430 may also be provided illustrating comparisons between total posts per day and the daily averages of days within the remainder of the year.

In UI 600, pop-up window 605 may be produced by selecting one of the daily curves (e.g., 405D) or one of the circles 505A-505F. In the pop-up window 605, the raw messages 610A-610F represented by each of the circles 505A-505F highlighted on the daily curve 405D. As illustrated each of the raw messages 610A-610F is displayed with the name of the poster/author 615, which is color coded to correspond to the color of the circle 505A-505F. Each of the raw messages 610A-610F is also displayed with the raw text 620 of the post or message 610A-610F.

In other example implementations, the color coding may encode for other attributes of the data other than just the user or author information. For example in some implementations the color-coding may encode for message sentiment, and/or detected user emotion. Further, in some example implementations, the user may have an option to choose which attributes they want to see on the visualization.

The curves 405A-405F illustrated in FIGS. 4-8 above are not limited to the display of daily posts and can be used to visualize other data. FIG. 9 illustrates a UI 900 with a generalized curve 905 showing a plurality of posts or messages 910A-910H distributed over a temporal range (Y-axis). The X-axis of the curve may correspond to a number or quantity of posts occurring within small temporal segment (temporal bin) as discussed in greater detail below. Similar to the daily curves discussed above, the generalized curve 905 may also include grey areas 915 correspond to the volume of posts occurring (e.g., for example, as a burst of posts) within the temporal segments. Keywords associated with the posts 910A-910H may also be displayed in regions 920 adjacent to the curve 905. The process for generating the curve is discussed in greater detail below with respect to FIGS. 10-14.

To adequately and intuitively present conversational threads, example implementations of the present application may attempt to reveal both overall trends and post-level information in a single representation. To attempt to achieve these goals, example implementations of the present application may use a curving representation illustrated in FIG. 9 discussed above including the key phrases extracted from the posts to summarize the content of conversational threads (e.g., Regions 920).

Figure 15:
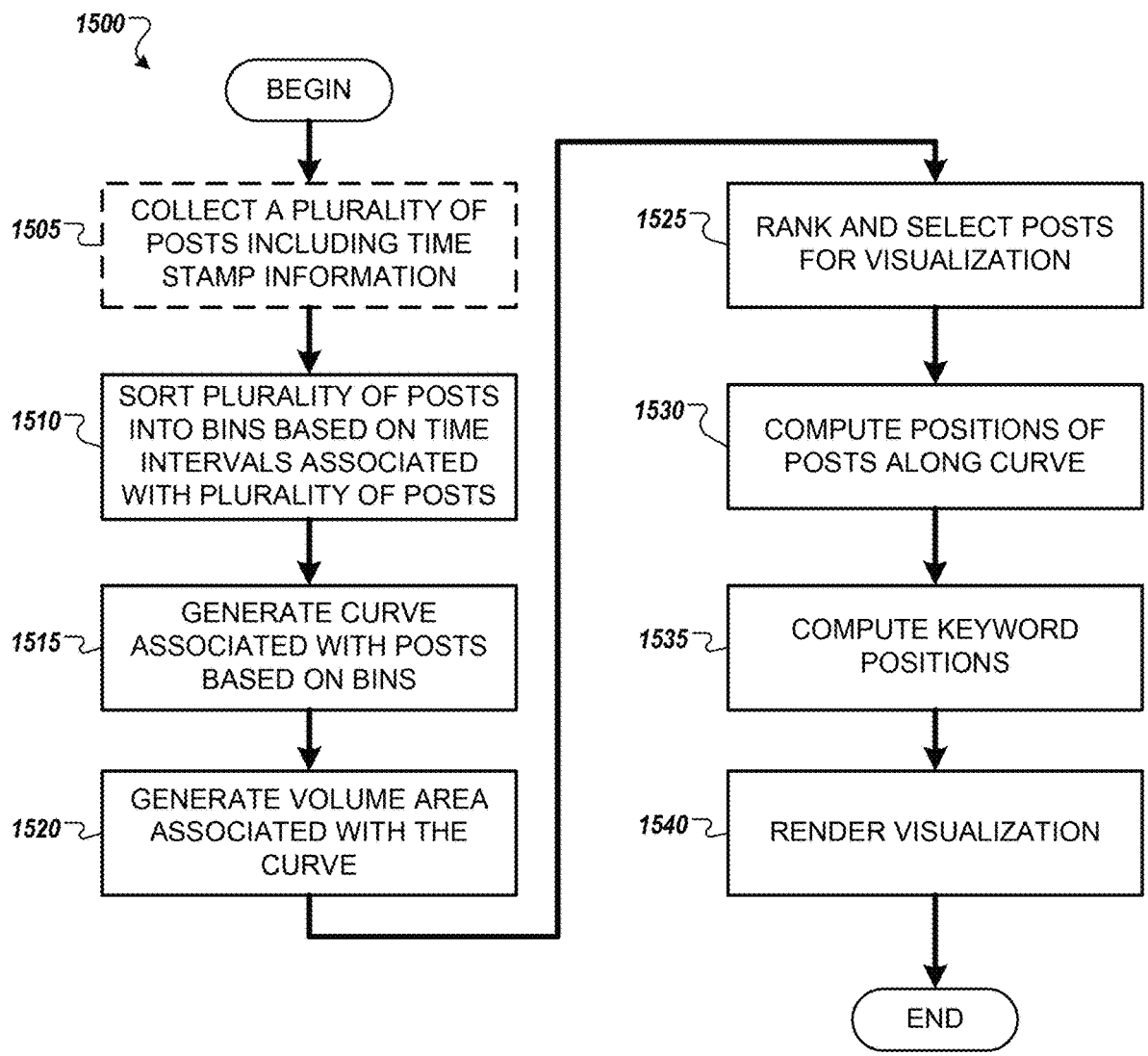
FIG. 15 illustrates a flow chart of a process for generating a visual representation in accordance with an example implementation of the present application.

FIG. 15 illustrates a flow chart of a process 1500 for generating a visual representation (e.g., FIG. 9) in accordance with an example implementation of the present application. Before visualization may be generated, a plurality of posts to be represented is required. In some example implementations, the plurality of posts may be provided in advance of the process 1500. In other example implementations, the plurality of posts may optionally be collected at 1505. The plurality of posts may be collected from a posting or messaging platform as may be apparent to a person of ordinary skill in the art. In some example implementations, the plurality of posts may also include time stamp data indicating dates and/or times of posting and may also include keyword or content information indicative of subject matter associated with the post or message. Once the plurality of posts is collected, the visual representation may be generated using the following steps.

Adaptive Binning of Posts.

As a first step of generating a curve (e.g. curve 905 of FIG. 9), a plurality of posts are adaptively binned at 1510. In other words, based on the timestamps associated with each post, the plurality of posts may be sorted into short time intervals represented by bins (e.g., 5 min time intervals associated with Bins). FIG. 10 illustrates a graphical representation 1000 of the binning process. As illustrated, a plurality of messages 1005A-1005H may be divided into a plurality of bins 1010A-1010G. As illustrated, two messages or posts 1005A and 1005B are placed in the first bin 1010A. Further, one message or post is placed into each of bins 1010B and 1010C (post 1005C is placed in bin 1010B and post 1005D is placed in bin 1010C). Additionally, one message or post is also placed into each of bins 1010D and 1010E (post 1005E is placed in bin 1010D and post 1005F is placed in bin 1010E). Finally, one message or post is placed into each of bins 1010F and 1010G (post 1005G is placed in bin 1010F and post 1005H is placed in bin 1010G). In some example implementations, the time interval of each bin may be determined by dynamically based on the available number of pixels to show the curve on the screen. If the number of pixels is smaller, the time interval will be larger.

Generating the Curve.

After the messages or posts have been divided into bins, a curve representing the posts may be generated at 1515. FIG. 11 illustrates a graphical representation 1100 of the curve generating process. As illustrated, based on the numbers of posts in the above bins 1010A-1010G, locations of dots representing points on a display screen that the curve must pass through are calculated. For example, a first dot 1105A may be centrally located within the bar representing the first bin 1010A. The widths of each of the bars representing the bins 1010A-1010G may be proportional to the numbers of posts within each bin 1010A-1010G. Once the first dot 1105A has been placed, additional dots 1105B-1105H may be placed alternating between left and right edges of the respective bins 1010A-1010G, as shown in FIG. 11. Finally, another dot 1105I corresponding to the last message in a sequence may also be centrally located on the last bin 1010G. Using these dots 1105A-1105I, a zig-zag B-spline curve 1110 can be generated using any computer graphics methodologies, which might be apparent to a person of ordinary skill in the art.

Generating the Volume Area.

In parallel with, prior to or subsequent to, generating the curve illustrated in FIG. 11, the volume area associated with the curve may also be generated at 1520. The volume of the curve may be generated in a process similar to the process used to generate the curve. FIG. 12 illustrates a graphical representation 1200 of the curve volume generating process. As illustrated, based on the numbers of posts in the above bins 1010A-1010G, locations of dots representing points on a display screen that edges of the curve volume must pass through are calculated. For example, a pair of first dots 1205A, 1210A may be centrally located within the bar representing the first bin 1010A.

Again, the widths of each of the bars representing the bins 1010A-1010G may be proportional to the numbers of posts within each bin 1010A-1010G. Once the first pair of dots 1205A, 1210A has been placed, additional dots 1205B-1205H, 1210B-1210H may be placed along the left and right edges of the respective bins 1010A-1010G, as shown in FIG. 12. Finally, another pair of dots 1205I, 1210I corresponding to the last message in a sequence may also be centrally located on the last bin 1010G. Using the dots 1205A-1205I, a zig-zag B-spline curve 1215 can be generated on the left edge of the bins 1010A-1010G using any computer graphics methodologies, which might be apparent to a person of ordinary skill in the art. Similarly, using the dots 1210A-1210I, a second zig-zag B-spline curve 1220 can be generated on the right edge of the bins 1010A-1010G also using any computer graphics methodologies, which might be apparent to a person of ordinary skill in the art.

As shown in FIG. 12, green points 1205A-1205I indicate the passing-through points of left edge of the volume of the curve 1110, and red points 1210A-1210I indicate the passing-through points of the edge of the volume of the curve 1110.

Ranking and Selection of Posts.

In some example implementations, there might not be enough space on a display screen to illustrate every post on the curve as the foreground. Thus, posts within each bin may be ranked and then selected according to the rank at 1525. For example, in some example implementations, the ranking may be based on the average weight of the extracted keywords in each post. The total number of posts that may be selected may be determined by the curve segment length available on the screen in terms of pixels.

Computing the Circle Positions.

Figures 13, 14:
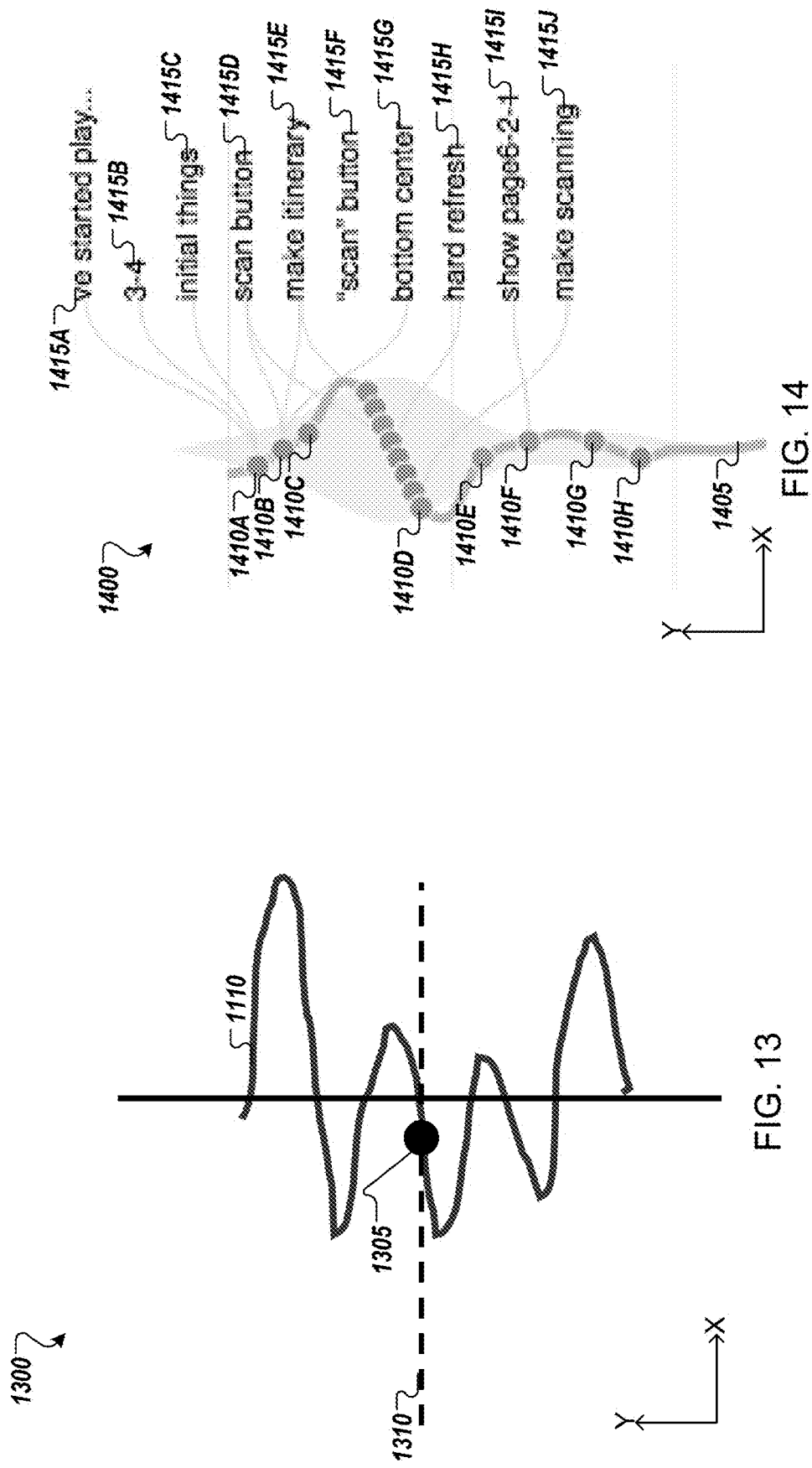
FIG. 13 illustrates a graphical representation of the circle positioning computation process in accordance with an example implementation of the present application.
FIG. 14 illustrates a graphical representation of a post curve in accordance with an example implementation of the present application.

After the representative posts to be displayed on the curve are selected, each selected post may be positioned on the curve at 1530. FIG. 13 illustrates a graphical representation 1300 of the circle positioning computation process. As illustrated, each post is presented by a dot 1305 placed on the curve 1110 by assigning a y-position based on a timestamp associated with the post. The x-position of the dot 1305 associated with the post may be determined by the intersection of the curve 1110 and the horizontal line 1310 passing through the y-position associated with the time stamp of the post. This may ensure that each of the post circles is drawn on the curve 1110.

Computing the Keyword Positions.

After the circle positions are calculated for each post to be shown, the keyword positions are computed at 1535. The keyword positions may be calculated using a force-directed layout method. FIG. 14 illustrates a graphical representation 1400 of a post curve 1405 with the posts 1410A-1410H. As illustrated, a plurality of keywords 1415A-1415J are positioned relative to the posts 1410A-1410H. The initial Y-position of each keyword 1415A-1415J may correspond to the Y-position of the associated posts 1410A-1410H where they are extracted. In order avoid Y-axis overlap, a repulsive factor or force may be applied between keywords 1415A-1415J to spread the keywords along the Y-axis. The X-axis position of each keyword 1415A-1415J may always be fixed to ensure that the keywords are vertically aligned.

Rendering.

Once the keyword positions have been calculated, a final step may be to render all the corresponding visual elements on the screen to produce the graphical representation 1400 illustrated in FIG. 14 at 1540. In some example implementations, the above computation process may be adaptive to the time-scale and available the display screen space. In some example implementations, the visual representation may attempt to provide as much important information as possible without producing too much visual clutter or visual complexity based on the available display screen space.

Once the visualization has been rendered, the process 1500 may end. The process 1500 may generate a single curve or visual representation of a single conversational thread. In some example implementations, multiple threads may be placed according to starting and ending times specified on a display window without overlap. In the embodiments discussed above, the specified display windows may be days or weeks (e.g., "Wed 24" in FIG. 5).

In some example implementations, curves may also be produced without post circles and keywords may be produced (e.g., FIG. 4, and curves 405A, 405F of FIG. 5) in a similar way. However, instead of rendering posts as circles, the corresponding curve segments may be colored based the majority of users in that segment.

In some example implementations, other aspects of the curve may be modified to illustrate the posts or messages instead of providing the dots associated with different posts. For example, the thickness of the line may be varied based on the number of posts represented by the curve. Alternatively, broken lines may be used to illustrate regions of no posts and solid lines may be used to illustrate regions of many posts. Additionally, in some example implementations, multiple curves may be nested over overlapped to illustrated comparative changes in topics or posting patterns in real-time. For example, curves 405C and 405E of FIG. 5 may be overlaid to show posting patterns by members of the same team on different topics in real-time.

Example Computing Environment

FIG. 16 illustrates an example computing environment 1600 with an example computer device 1605 suitable for use in some example implementations. Computing device 1605 in computing environment 1600 can include one or more processing units, cores, or processors 1610, memory 1615 (e.g., RAM, ROM, and/or the like), internal storage 1620 (e.g., magnetic, optical, solid state storage, and/or organic), and/or I/O interface 1625, any of which can be coupled on a communication mechanism or bus 1630 for communicating information or embedded in the computing device 1605.

Computing device 1605 can be communicatively coupled to input/user interface 1635 and output device/interface 1640. Either one or both of input/user interface 1635 and output device/interface 1640 can be a wired or wireless interface and can be detachable. Input/user interface 1635 may include any device, component, sensor, or interface, physical or virtual, which can be used to provide input (e.g., buttons, touch-screen interface, keyboard, a pointing/cursor control, microphone, camera, braille, motion sensor, optical reader, and/or the like). Output device/interface 1640 may include a display, television, monitor, printer, speaker, braille, or the like. In some example implementations, input/user interface 1635 and output device/interface 1640 can be embedded with, or physically coupled to, the computing device 1605. In other example implementations, other computing devices may function as, or provide the functions of, an input/user interface 1635 and output device/interface 1640 for a computing device 1605.

Examples of computing device 1605 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, server devices, other computers, information kiosks, televisions with one or more processors embedded therein and/or coupled thereto, radios, and the like).

Computing device 1605 can be communicatively coupled (e.g., via I/O interface 1625) to external storage 1645 and network 1650 for communicating with any number of networked components, devices, and systems, including one or more computing devices of the same or different configuration. Computing device 1605 or any connected computing device can be functioning as, providing services of, or referred to as a server, client, thin server, general machine, special-purpose machine, or another label.

I/O interface 1625 can include, but is not limited to, wired and/or wireless interfaces using any communication or I/O protocols or standards (e.g., Ethernet, 802.11xs, Universal System Bus, WiMAX, modem, a cellular network protocol, and the like) for communicating information to and/or from at least all the connected components, devices, and network in computing environment 1600. Network 1650 can be any network or combination of networks (e.g., the Internet, local area network, wide area network, a telephonic network, a cellular network, satellite network, and the like).

Computing device 1605 can use and/or communicate using computer-usable or computer-readable media, including transitory media and non-transitory media. Transitory media includes transmission media (e.g., metal cables, fiber optics), signals, carrier waves, and the like. Non-transitory media included magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 1605 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C #, Java, Visual Basic, Python, Perl, JavaScript, and others).

Processor(s) 1610 can execute under any operating system (OS) (not shown), in a native or virtual environment. One or more applications can be deployed that include logic unit 1655, application programming interface (API) unit 1660, input unit 1665, output unit 1670, de-threading unit 1675, keyword extraction unit 1680, visualization generating unit 1685, and inter-unit communication mechanism 1695 for the different units to communicate with each other, with the OS, and with other applications (not shown). For example, the de-threading unit 1675, the keyword extraction unit 1680, and the visualization generating unit 1685 may implement one or more processes shown in FIGS. 1A and 15. The described units and elements can be varied in design, function, configuration, or implementation and are not limited to the descriptions provided.

In some example implementations, when information or an execution instruction is received by API unit 1660, it may be communicated to one or more other units (e.g., logic unit 1655, input unit 1665, de-threading unit 1675, keyword extraction unit 1680, and visualization generating unit 1685). For example, the de-threading unit 1675 may separate interleaved conversations into conversational threads and provide the conversational threads to the visualization generating unit 1685. Similarly, the keyword extraction unit 1680 may extract content features from the posts and assign keywords based on the extracted content features. Additionally, the keyword extraction unit 1680 may provide the keywords to the visualization generating unit 1685.

In some instances, the logic unit 1655 may be configured to control the information flow among the units and direct the services provided by API unit 1660, input unit 1665, de-threading unit 1675, keyword extraction unit 1680, and visualization generating unit 1685 in some example implementations described above. For example, the flow of one or more processes or implementations may be controlled by logic unit 1655 alone or in conjunction with API unit 1660.

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

What is claimed is:

1. A method of analyzing conversational messages, the method comprising:
   receiving a query defining a timespan of messages, wherein the defined timespan comprises at least a plurality of time intervals;
   retrieving at least two conversational messages associated with the defined timespan from a plurality of interleaved messages;
   de-threading the at least two conversational messages to identify a plurality of conversational threads; and
   generating a visualization of the plurality of conversational threads based on the defined timespan and the plurality of conversational threads, the visualization comprising:
      a plurality of columns each representative of a time interval of the plurality of time intervals and extending in a first direction representative of a temporal axis, each column comprising at least one conversational thread of the plurality of conversational threads and at least one column comprising two or more conversational threads of the plurality of conversational threads, and
      a plurality of line curves representative of the plurality of conversational threads, each of the plurality of line curves positioned in a column and extending along the first direction, wherein each line curve fluctuates in a second direction representative of a quantity of messages associated with each respective conversational thread occurring within a temporal increment of the temporal axis,
   wherein generating the visualization of the plurality of conversational threads comprises, for at least one conversational thread:
      sorting interleaved messages of the at least one conversational thread into a plurality of bins, each bin associated with a number of the interleaved messages of the at least one conversational thread; and
      generating a line curve representative of the at least one conversational thread based on the plurality of bins by calculating, for each bin, at least one point in the second direction based on the number of interleaved messages associated with each bin and generating a zig-zag B-spline curve between each of the at least one points.

2. The method of claim 1, further comprising retrieving at least one message author associated with the defined timespan from a plurality authors associated with the plurality of interleaved messages,
   wherein portions of at least one line curve of the plurality of line curves comprise a color associated with an author of a post representative by the corresponding portion of the at least one line curve.

3. The method of claim 1, wherein at least one line curve of the plurality of line curves further comprises a plurality of dots arranged on a portion of the at least one line curve, wherein each of the plurality of dots represents a post in the plurality associated with the conversational thread represented by the at least one line curve.

4. The method of claim 2, further comprising retrieving at least one message author associated with the defined timespan from a plurality authors associated with the plurality of interleaved messages,
   wherein each of the plurality of dots of the at least one line curve comprise a color associated with an author of a post representative by the corresponding dot of the plurality of dots.

5. The method of claim 1, wherein the plurality of line curves further comprises grey regions representative of a volume of posts associated with the conversational thread occurring during within the temporal increment of the temporal axis.

6. The method of claim 5, wherein at least one line curve of the plurality of line curves further comprises at least one keyword extracted from at least one post associated with the conversational thread.

7. A non-transitory computer readable medium having stored therein a program for making a computer execute a method of analyzing conversational messages, a method of analyzing conversational messages, the method comprising:
   receiving a query defining a timespan of messages, wherein the defined timespan comprises at least a plurality of time intervals;
   retrieving at least two conversational messages associated with the defined timespan from a plurality of interleaved messages;
   de-threading the at least two conversational messages to identify a plurality of conversational threads; and
   generating a visualization of the plurality of conversational threads based on the defined timespan and the plurality of conversational threads, the visualization comprising:
      a plurality of columns each representative of a time interval of the plurality of time intervals and extending in a first direction representative of a temporal axis, each column comprising at least one conversational thread of the plurality of conversational threads and at least one column comprising two or more conversational threads of the plurality of conversational threads, and
      a plurality of line curves representative of the plurality of conversational threads, each of the plurality of line curves positioned in a column and extending along the first direction, wherein each line curve fluctuates in a second direction representative of a quantity of messages associated with each respective conversational thread occurring within a temporal increment of the temporal axis,
   wherein generating the visualization of the plurality of conversational threads comprises, for at least one conversational thread:
      sorting interleaved messages of the at least one conversational thread into a plurality of bins, each bin associated with a number of the interleaved messages of the at least one conversational thread; and
      generating a line curve representative of the at least one conversational thread based on the plurality of bins by calculating, for each bin, at least one point in the second direction based on the number of interleaved messages associated with each bin and generating a zig-zag B-spline curve between each of the at least one points.

8. The non-transitory computer readable medium of claim 7, further comprising retrieving at least one message author associated with the defined timespan from a plurality authors associated with the plurality of interleaved messages,
   wherein portions of at least one line curve of the plurality of line curves comprise a color associated with an author of a post representative by the corresponding portion of the at least one line curve.

9. The non-transitory computer readable medium of claim 7, wherein at least one line curve of the plurality of line curves further comprises a plurality of dots arranged on a portion of the at least one line curve, wherein each of the plurality of dots represents a post in the plurality associated with the conversational thread represented by the at least one line curve.

10. The non-transitory computer readable medium of claim 9, further comprising retrieving at least one message author associated with the defined timespan from a plurality authors associated with the plurality of interleaved messages,
   wherein each of the plurality of dots of the at least one line curve comprise a color associated with an author of a post representative by the corresponding dot of the plurality of dots.

11. The non-transitory computer readable medium of claim 7, wherein the plurality of line curves further comprises grey regions representative of a volume of posts associated with the conversational thread occurring during within the temporal increment of the temporal axis.

12. The non-transitory computer readable medium of claim 11, wherein at least one line curve of the plurality of line curves further comprises at least one keyword extracted from at least one post associated with the conversational thread.

13. A computer apparatus configured to analyze a corpus comprising a plurality of unstructured messages, the computer apparatus comprising:
   a memory storing the plurality of interleaved messages; and
   a processor executing a process comprising:
      receiving a query defining a timespan of messages, wherein the defined timespan comprises at least a plurality of time intervals;
      retrieving at least two conversational messages associated with the defined timespan from a plurality of interleaved messages;
      de-threading the at least two conversational messages to identify a plurality of conversational threads; and
      generating a visualization of the plurality of conversational threads based on the defined timespan and the plurality of conversational threads, the visualization comprising:
         a plurality of columns each representative of a time interval of the plurality of time intervals and extending in a first direction representative of a temporal axis, each column comprising at least one conversational thread of the plurality of conversational threads and at least one column comprising two or more conversational threads of the plurality of conversational threads, and
         a plurality of line curves representative of the plurality of conversational threads, each of the plurality of line curves positioned in a column and extending along the first direction, wherein each line curve fluctuates in a second direction representative of a quantity of messages associated with each respective conversational thread occurring within a temporal increment of the temporal axis, wherein generating the visualization of the plurality of conversational threads comprises, for at least one conversational thread:

sorting interleaved messages of the at least one conversational thread into a plurality of bins, each bin associated with a number of the interleaved messages of the at least one conversational thread; and generating a line curve representative of the at least one conversational thread based on the plurality of bins by calculating, for each bin, at least one point in the second direction based on the number of interleaved messages associated with each bin and generating a zig-zag B-spline curve between each of the at least one points.

14. The computer apparatus of claim 13, further comprising retrieving at least one message author associated with the defined timespan from a plurality authors associated with the plurality of interleaved messages, wherein portions of at least one line curve of the plurality of line curves comprise a color associated with an author of a post representative by the corresponding portion of the at least one line curve.

15. The computer apparatus of claim 13, wherein at least one line curve of the plurality of line curves further comprises a plurality of dots arranged on a portion of the at least one line curve, wherein each of the plurality of dots represents a post in the plurality associated with the conversational thread represented by the at least one line curve.

16. The computer apparatus of claim 15, further comprising retrieving at least one message author associated with the defined timespan from a plurality authors associated with the plurality of interleaved messages, wherein each of the plurality of dots of the at least one line curve comprise a color associated with an author of a post representative by the corresponding dot of the plurality of dots.

17. The computer apparatus of claim 13, wherein the plurality of line curves further comprises grey regions representative of a volume of posts associated with the conversational thread occurring during within the temporal increment of the temporal axis.

18. The method of claim 1, wherein the plurality of time intervals is a plurality of days.

19. The method of claim 1, wherein generating the visualization of the plurality of conversational threads comprises, for the at least one conversational thread:

sorting the interleaved messages of the at least one conversational thread into the plurality of bins based on timestamps associated with each interleaved message of the at least one conversational thread; and determining a representative interleaved message for each bin based on ranking the interleaved messages corresponding to each bin and selecting a highest ranked interleaved message for each bin, wherein the at least one line curve representative of the at least one conversational thread comprises a plurality of dots arranged on the at least one line curve, each dot positioned at one of the at least one points of a respective bin and each dot is representative of a determined representative interleaved messages corresponding the respective bin.

20. The method of claim 1, wherein each column further comprises a region comprising:

one or more first box plots representative of a comparison between authors associated with the plurality of interleaved messages per the respective time interval and averages for the respective time interval within the remainder of a calendar year; and one or more second box plots representative of a comparison between a total number of interleaved messages per the respective time interval and averages for the respective time interval within the remainder of a calendar year.

\* \* \* \* \*